July 12, 1960
E. R. DOAK
2,944,395
MEANS AND METHODS OF NEUTRALIZING AND
CONVERTING THRUST COMPONENTS
Filed June 6, 1955
3 Sheets-Sheet 1
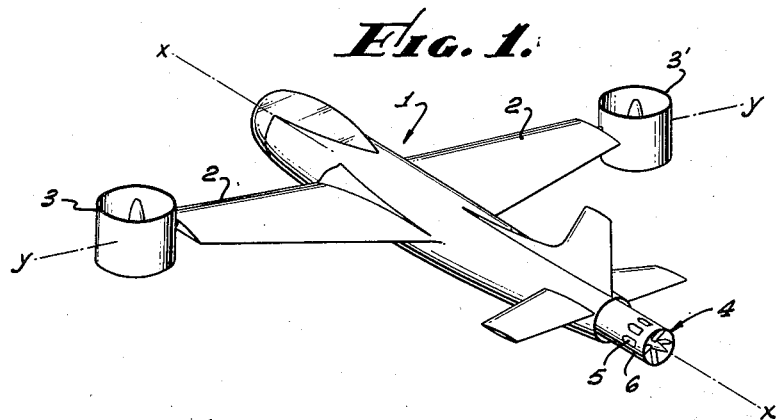
FIG. 1.
FIG. 2.
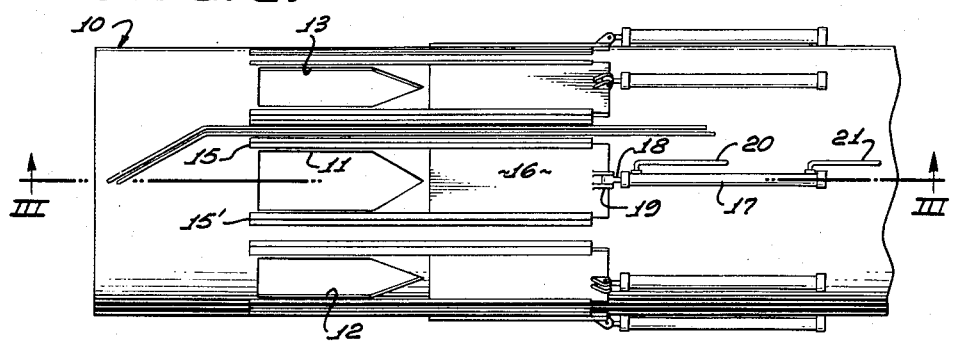
FIG. 3.
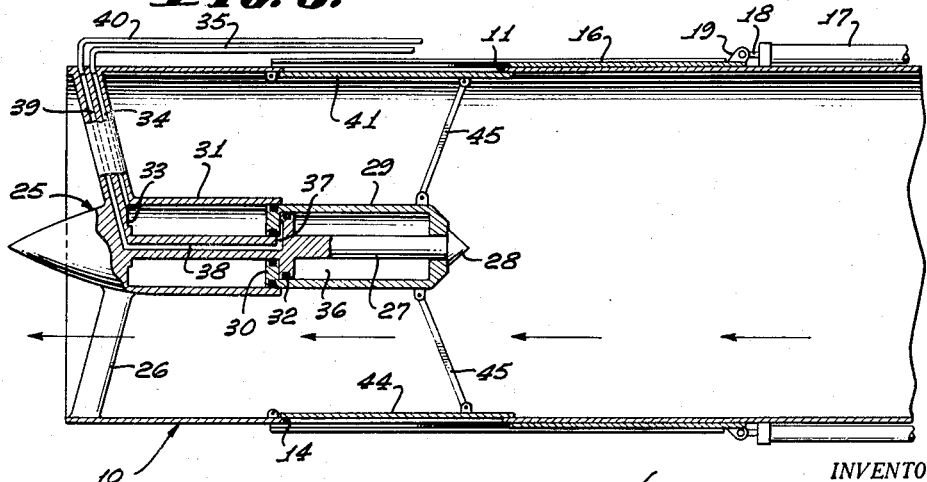
INVENTOR.
EDMOND R. DOAK
BY
ATTORNEY.

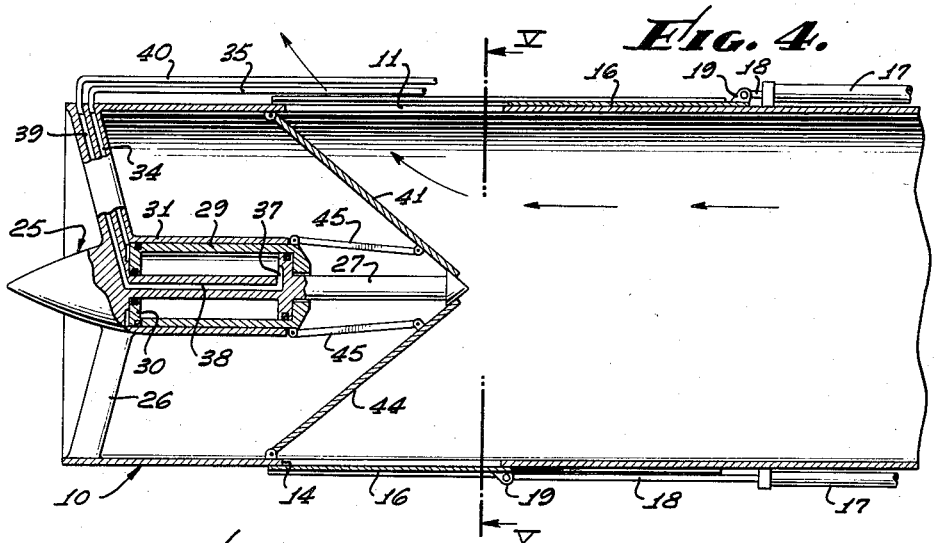
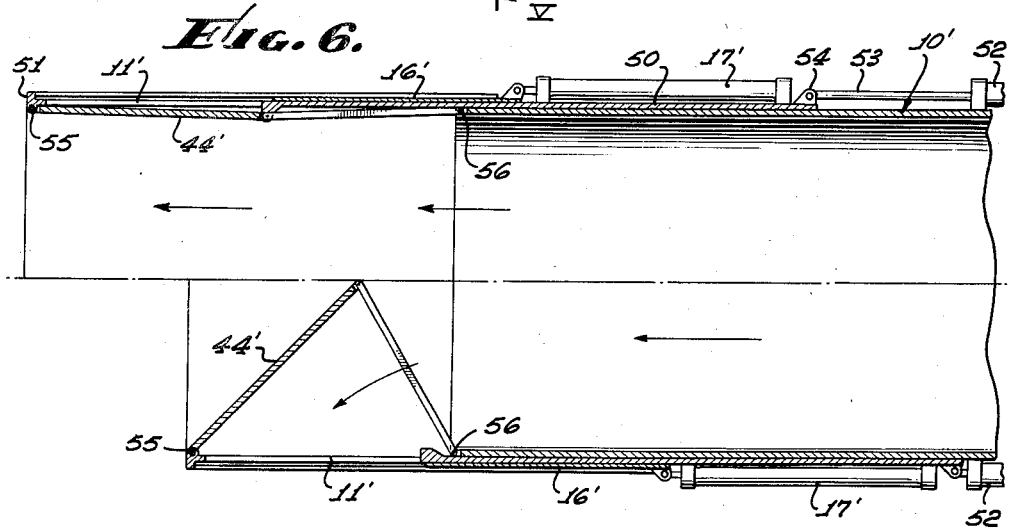
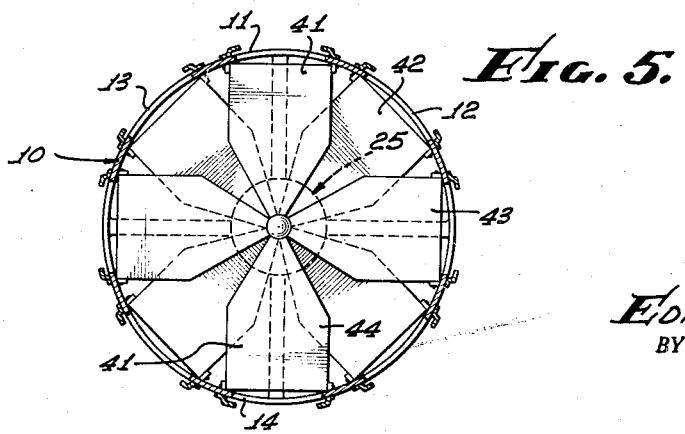

July 12, 1960

E. R. DOAK 2,944,395

MEANS AND METHODS OF NEUTRALIZING AND
CONVERTING THRUST COMPONENTS

Filed June 6, 1955

INVENTOR.
EDMOND R. DOAK
BY
ATTORNEY.

United States Patent Office 2,944,395
Patented July 12, 1960

2,944,395

MEANS AND METHODS OF NEUTRALIZING AND CONVERTING THRUST COMPONENTS

Edmond R. Doak, Los Angeles, Calif., assignor to Doak Aircraft Co., Inc., Torrance, Calif., a corporation of California Filed June 6, 1955, Ser. No. 513,344

2 Claims. (Cl. 60—35.54)

This invention relates to means and methods whereby the thrust or exhaust generated by a jet-type engine and the like may be neutralized or converted into a thrust component which is angularly related with respect to the normal axial direction of flow of exhaust gases or thrust, such translation being utilizable in controlling the pitch and yaw of an aircraft and in facilitating hovering or rapid deceleration.

Many types of aircraft are now utilizing power plants which produce a high velocity exhaust, such exhaust resulting in forwardly directed, utilizable thrust. Such power plants are all variations of an athodyd and include a ramjet, pulsejet, turboprop or propjet, and the turbojet. Most of these power plants and aircraft utilizing the same are most efficient at high speeds and problems have arisen in controlling aircraft equipped with such engines or power plants, particularly when landing or where an unbalanced condition arises due to failure of one engine of a multi-engine aircraft. The present invention is directed toward means and methods whereby the direction of the thrust generated by such power plant may be controllably varied, thereby permitting a secondary utilization of such thrust. Moreover, the device of the present invention may be employed in generating a variable back pressure in the exhaust cone or nozzle of such engines, thereby permitting the engine to operate at effective thermal efficiency and reducing the possibility of flame-out.

Generally stated, the advantageous results of the present invention referred to in greater detail hereafter are attained by the provision of a plurality of circumferentially spaced, radially directed ports in the walls of the tail pipe or nozzle, controllable door means for selectively covering and uncovering such ports, and obturating elements controllably movable into the normal path of the exhaust gases, such elements deflecting the gases into and through said ports. In this manner thrust may be dissipated radially instead of axially or by only having selected ports open, the thrust may be utilized in controlling yaw or pitching of the aircraft.

An object of the present invention, therefore, is to disclose and provide means for secondary utilization of the thrust normally generated by a jet-type engine.

A further object of the invention is to disclose and provide means whereby yaw and pitch of an aircraft may be controlled or modified by secondary utilization of the thrust normally generated by a jet-type engine designed primarily for the production of a forward component.

These and other objects, uses, advantages and details of the present invention will become apparent from the description given hereinafter. In order to facilitate understanding, reference will be had to the appended drawings, in which:

Fig. 1 is a perspective view of an aircraft provided with a single, rearwardly directed exhaust duct nozzle or tail pipe of a power plant.

Fig. 2 is an external side elevation of one form of device embodying the present invention showing the radial ports in open position.

Fig. 3 is a longitudinal section taken along the plane III—III in Fig. 2 showing the obturating elements or vanes in normal or open position.

Fig. 4 is a longitudinal section showing the vanes in closed position with a port open on one side and closed on the other side.

Fig. 5 is a transverse section looking aft along the plane V—V of Fig. 4.

Fig. 6 is a longitudinal section through a modified form of device, the upper portion indicating the position of the elements with the vanes open and the lower section illustrating a position with the vanes closed.

Figure 8:
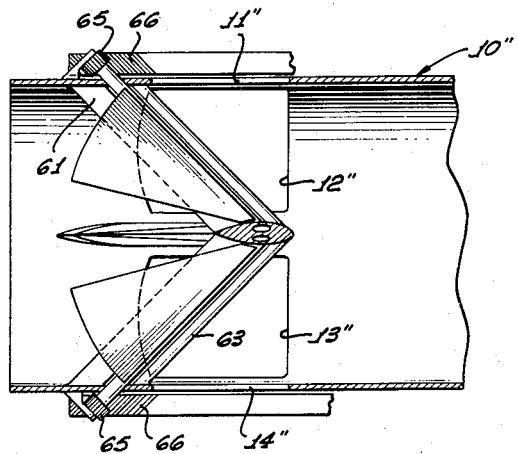
Fig. 8 is a longitudinal section taken along plane VIII—VIII of the modification illustrated in Fig. 7.

For purposes of orientation, reference is made to Fig. 1 wherein the aircraft 1 is shown as being provided with wings 2, the principal or longitudinal axis (also known as the axis of roll or the axis of bank) being indicated at $x$—$x$. Although the devices and method of the present invention are applicable to all types of aircraft, that illustrated is provided with ducted fan units 3 and 3' carried by the wing tips, such units being rotatable about the lateral or pitch axis $y$—$y$ of the aircraft. This type of aircraft is described in a copending application Serial No. 472,313. The tail pipe or nozzle through which the power plant exhausts and discharges high velocity gases rearwardly along the longitudinal axis (or one parallel thereto) is indicated at 4. It will be noted that this tail pipe extends beyond the body or tail section of the aircraft 1 and is provided with a plurality of circumferentially spaced ports 5, 6 and the like.

When in normal, forward flight, the thrust-generating elements such as the ducted fan units 3 and 3', as well as the main power plant, are so positioned that their thrust facilitates forward progress of the aircraft, the units 3 and 3' being rotated so as to direct their thrust components along an axis substantially parallel to the longitudinal axis. When hovering, such thrust-generating units 3 and 3' may be positioned as shown, directing their thrust substantially downwardly (substantially parallel to the vertical axis of the aircraft). In order to obtain maximum hovering ability the rearwardly directed thrust through the tail pipe or nozzle 4 should be neutralized and such neutralization is made possible by the present invention by providing selectively and controllably operable obturating means which form a cone within the tail pipe 4 and direct the exhaust gases radially outwardly through the ports 5, 6 and the like.

Furthermore, since the ports are provided with controllable doors for covering and uncovering any one or more of the ports, control of yaw may be obtained by obstructing radial flow in all ports on one side, thereby obtaining a side thrust or component tending to turn the aircraft around its vertical axis. Similarly, by blocking all of the upward facing ports, a downwardly directed thrust is attained, causing the aircraft to pitch along the $y$—$y$ axis. The oppositely directed lateral ports which are open will produce equal and opposing thrusts which will balance out. The arrangement here disclosed permits flexible, controllable generation of directional thrust components without excessive back pressure on the engine and resultant loss in power output.

Figs. 2 to 5 inclusive, disclose one form of device adapted to operate in the manner described hereinbefore. As there shown, the nozzle or fixed tail pipe 10 is provided with a plurality of radially directed, circumferentially spaced ports such as 11, 12, 13, 14. These ports are preferably elongated and may be wider adjacent the outlet end of the nozzle than at the forward end, such as 12'. These ports are preferably near the outlet end of the nozzle and beyond the body or tail structure of the aircraft.

Controllable means are provided for covering and uncovering said ports. Such means may comprise guides such as 15 and 15' adjacent such port and a door 16 slidable along such guides so as to close the port in one position and open the port in another position. Any suitable means may be used in actuating the doors. For purposes of illustration, the door 16 is shown provided with an actuating cylinder 17 containing an actuating piston whose rod 18 is connected to an end portion of the door 16 as at 19. Pressure fluid lines 20 and 21 connected to opposite ends of the actuating cylinder 17 lead to valving system, source of fluid pressure and reservoir whereby, at the control of the pilot of the aircraft, the door 16 may be caused to either cover or uncover the port 13. Similar actuating means are associated with each of the other doors covering and uncovering each of the other ports.

It may be noted that the various radially directed ports 11–14 may be of equal size or such ports may alternate in size, the larger ports being positioned in the horizontal and vertical planes. Moreover, although ports provided with forward areas smaller than rearwardly directed areas have been illustrated, the invention is not limited thereto.

Obturating means are provided for virtually closing the open or discharge end of the nozzle and deflecting thrust outwardly through the various ports 11–14. In the form of device illustrated in Figs. 1–5 a centrally located vane actuator is generally indicated at 25. It is preferable that such actuator is faired or streamlined so as not to impede the normal rearward flow of the exhaust gases. Actuator 25 may be held in its position by means of a spider having 2, 3 or 4 arms, such as the arm 26 connected to the nozzle 10. The arms may also be streamlined and provide a housing for pressure fluid conduits leading to the actuator.

In the form illustrated, the actuator 25 is provided with a forwardly directed, central, cylindrical, stationary portion 27 terminating in the head 28. Slidably mounted along the central portion 27 is a hollow, cylindrical member 29. The member 29 is provided with a rear, inwardly directed wall 30. The stationary portion of the actuator may also be provided with an external cylindrical member 31. Fluid-tight connection is made between the movable member 29, the external stationary cylindrical member 31 and the centrally disposed stationary portion 27 by means of suitable seals, O rings and the like, such as the one indicated at 32. The rear face of wall 30 communicates with a chamber 33 capable of being supplied with pressure fluid through conduit 34 and supply line 35, whereupon the movable member 29 may be caused to slide forwardly along the central, stationary portion 27. The chamber 36 formed within the hollow movable member 29 is in communication with a port 37 leading to channel 38, conduit 39 and supply or relief line 40. The pressure fluid lines 35 and 40 extend into the body of the aircraft and by well-known arrangements of valves, pumps, reservoirs and the like, the movement of the movable member 29 of actuator 25 may be controlled by the pilot or flight engineer.

Adjacent the rear edge of each port there is pivotally or hingedly connected to the tail pipe or nozzle 10 a vane such as the vane 41, the vane being of such size or contour as to virtually close the port 11 when such vane is adjacent or in contact with the inner surface of the nozzle. Similar vanes 42, 43, 44 cooperate with their respective ports. Each vane, such as the vane 41, is connected by means of a link, such as 45, to the movable element 29 of the actuator. When the actuator is in its forward position (adjacent the head 28) the vanes close the respective radial ports and are said to be in open position, inasmuch as the exhaust gases are unimpeded and pass axially through the tail pipe or nozzle. When, however, it is desired to neutralize such thrust or to employ it for the purpose of controlling yaw or pitch, then the actuator member 29 is moved rearwardly, causing the vanes 41–44 to extend into the path of travel of the gases, the movable ends of such vanes then resting against the head 28 of the actuator and forming a virtual cone whose sides are at an obtuse angle to the gases being discharged. In such position (termed a closed position) the gases from the jet-type engines are deflected by such vanes through ports which have been opened by their respective doors such as 16.

The various vanes 41–44 may be triangular or of any other desired shape or configuration. It is not necessary however, that these vanes, when in closed position, completely obturate the open end of the nozzle. As a matter of fact, it has been found desirable in some instances to purposely permit some of the exhaust gases to be discharged axially and in some instances portions of the vanes, particularly those adjacent the inner walls of the nozzle 10, may be perforated. Moreover, the various links such as 45 need not be of exactly the same length but instead alternate links may be slightly shorter than intervening links so as to facilitate overlapping of the vanes when they are in closed position, as best seen in Fig. 5.

It may be noted at this time that the presence of a centrally disposed, streamlined actuator such as 25 at or near the open discharge end of a tail pipe or nozzle of a jet engine appears to exert a guiding effect upon the exhaust gases.

The modification illustrated in Fig. 6 distinguishes from that shown in Figs. 2–5 in that the stationary portion of the nozzle or tail pipe 10' is provided with a cylindrical, slidable extension 50, terminating in an end ring 51, such extension being provided with the various ports 11'–14'. This slidable extension 50 is shown in extended form in the top half of Fig. 6, having been moved into this position by actuating cylinder 52 operably connected as by rod 53 to the extension 50 at 54. Any other suitable means for moving the extension 50 may be utilized. In this extended position the port 14' is closed by the vane 44', the vane 44' being hingedly connected to the ring 51 as at 55. The vane 44' is also pivotally connected to a link 45', the opposite end of the link being pivotally connected as at 56 to the end of the stationary exhaust nozzle 10'.

By retracting the tubular extension 50 (as by means of a working cylinder or cylinders 52) the various vanes 41'–44' are caused to extend inwardly and assume the position indicated in the lower half of Fig. 6. These various vanes therefore form obturating elements which lie in planes at an obtuse angle to the direction of flow of gases through the nozzle to deflect said gases into the ports 11'–14', thereby converting or translating the axial thrust into a laterally dispersed thrust.

Controllable door means are provided so as to selectively direct the thrust for the control of pitch or yaw. Such means may comprise guides and sliding doors such as the door 16' carried by the slidable extension 50, each of such doors being under the selective control of an associated door-moving means such as the cylinder 17'. Conduits supplying and relieving each of the working cylinders may include flexible hose sections to accommodate the movement of the entire slidable assembly 50.

Figure 9:
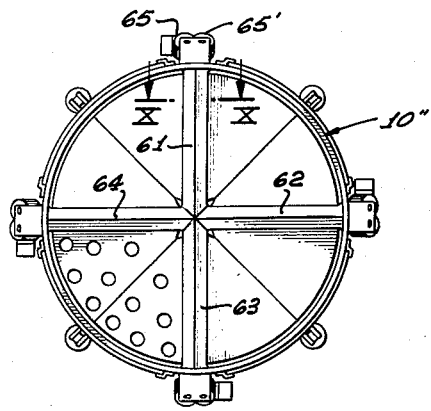
Fig. 9 is an end view of the arrangement illustrated in Figs. 7 and 8, showing the vanes in closed position.
Figure 7:
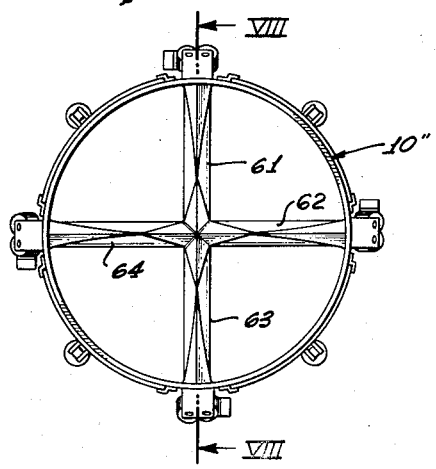
Fig. 7 is an end view of a still further modification, showing the vanes in open position.
Figure 10:
Fig. 10 is a partial section along plane X—X in Fig. 9.

A still further modification is illustrated in Figs. 7, 8 and 9. This modification distinguishes from the preceding forms of the invention in that it illustrates a mechanical means for actuating the obturating elements or vanes and in the form of such vanes. As there shown the stationary tail pipe 10″ is again provided with a plurality of radially directed, circumferentially spaced ports 11″–14″, near the discharge end of the nozzle 10″. Positioned within this nozzle is a spider having four fixed arms 61, 62, 63 and 64. These arms are joined in an apex which is axial with respect to the nozzle and lie at a desired angle of, say, 120° to 150° to the oncoming exhaust gases. Each of the arms of the spider, such as the arm 61, is, in effect, a pair of parallel rods, each rod carrying a tubular, rotatable sleeve terminating, exteriorly of the nozzle 10′, in a pinion gear, the pinion gears 65 and 65′ intermeshing. One of the pinion gears of each pair, such as the gear 65, is in engagement with a movable rack 66 provided with inclined teeth whereby longitudinal movement of the rack 66 is converted into partial rotation in opposite directions of the gears 65 and 65′ and of the tubular sleeves extending into the duct or nozzle. Each of the tubular sleeves carries a vane, so that the actuating means or rack 66 causes the vanes 67 and 68 to open and to close like wings of a butterfly. When the vanes are in extended position they close or obturate the nozzle; when the vanes 67 and 68 are collapsed such vanes lie adjacent to one another and do not impede the discharge of gases through the nozzle. When the vanes are extended and in obturating position the high velocity gases are discharged through the various radial ports. Again, as in the previous modifications, the nozzle or tail pipe is provided with selectively movable and controllable doors arranged to open or cover the ports, thereby permitting the pilot to selectively translate axial thrust into a lateral thrust exerted either horizontally, in opposite directions, horizontally in one direction only, vertical in both directions, or vertical in one direction only. The vanes may have perforations for the purpose of increasing the drag component and such perforations are illustrated at 70.

It is to be understood that the various racks 66 may be interconnected and actuated simultaneously through a sliding ring or each of said racks 66 may be provided with a separate actuator, the various actuators being interconnected for simultaneous operation.

From the above description it will be evident that the concepts herein disclosed provide controllable and variably adjustable means which attain the various objective referred to and solve or minimize the problems which have been previously encountered in the handling and control of aircraft employing or producing high velocity gas jets. The neutralization and deflection of thrust, particularly in multi-engine aircraft, also greatly facilitates deceleration by normal braking means, without completely stopping engines or squirting the exhaust gases forward (where they may be drawn into the intake with dangerous results) or impinge upon aircraft surfaces in an undesirable manner.

It may also be noted that although the radial parts are preferably near the discharge end of the nozzle or duct, the configuration of the aircraft, the number of ducts used, and other considerations may make it desirable to space the parts from the end of the nozzle or duct, the term "near the end" embracing such modifications. As previously noted, the obturating means do not actually seal the normal discharge channel and "obturating" as used herein embraces elements and operations which are effective in appreciably reducing or neutralizing the normal thrust and deflecting the gases in a direction angularly related to the direction of normal thrust.

I claim:

1. A device for utilization of thrust generated by a jet-type engine on an aircraft to control yaw and pitch comprising in combination: a single, thin-walled substantially cylindrical, open-ended nozzle having a longitudinal axis and extending beyond the body of an aircraft; at least four circumferentially spaced, radially directed ports in a common transverse plane, near the end of said nozzle and door means slidably mounted on the outer surface of said nozzle for covering and uncovering each of said ports; means carried by said nozzle for controllably and selectively actuating each of said door means; an obturating vane pivotally mounted at its rear edge on the inner surface of said nozzle adjacent the rear edge of each of said ports, said vanes being movable from an inobturating position closing the ports into position obturating the open end of the nozzle and deflecting thrust into said ports; and streamlined, separate, vane-actuating means centrally located within said nozzle along said longitudinal axis for pivoting said vanes between obturating and inobturating positions.

2. The device as stated in claim 1 wherein said vane actuating means includes a stationary member fixed to the walls of said nozzle and a cylindrical member slidably mounted in an axial direction on said stationary member, linkage means pivotally connecting the forward edge of each vane with the forward portion of said movable element, and separate control means for actuating said movable member forwardly and rearwardly on said stationary member whereby said vanes are movable into a conical structure having an apex directed toward the gases being ejected through said nozzle to deflect the gases into said ports in the obturating position.

References Cited in the file of this patent

UNITED STATES PATENTS

| | | |
|---|---|---|
| 340,237 | Nagel et al. | Apr. 20, 1886 |
| 1,237,364 | Miller | Aug. 21, 1917 |
| 1,457,024 | Franzen | May 29, 1923 |
| 2,024,274 | Campini | Dec. 17, 1935 |
| 2,280,835 | Lysholm | Apr. 28, 1942 |
| 2,637,164 | Robson et al. | May 5, 1953 |
| 2,681,548 | Kappus | June 22, 1954 |
| 2,696,709 | Oulianoff | Dec. 14, 1954 |
| 2,793,494 | Kadosch et al. | May 28, 1957 |

FOREIGN PATENTS

| | | |
|---|---|---|
| 610,143 | Great Britain | Oct. 12, 1948 |
| 860,754 | Germany | Dec. 22, 1952 |
| 1,092,654 | France | Nov. 10, 1954 |
| 510,584 | Canada | Mar. 1, 1955 |
| 63,238 | France | Mar. 30, 1955 |